(12) United States Patent
Futaki et al.

(10) Patent No.: US 11,252,643 B2
(45) Date of Patent: Feb. 15, 2022

(54) RADIO ACCESS NETWORK NODE, RADIO TERMINAL, AND METHODS AND NON-TRANSITORY COMPUTER-READABLE MEDIA THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/474,337

(22) PCT Filed: Nov. 21, 2017

(86) PCT No.: PCT/JP2017/041823
§ 371 (c)(1),
(2) Date: Jun. 27, 2019

(87) PCT Pub. No.: WO2018/128019
PCT Pub. Date: Jul. 12, 2018

(65) Prior Publication Data
US 2019/0342824 A1 Nov. 7, 2019

(30) Foreign Application Priority Data
Jan. 5, 2017 (JP) .............................. JP2017-000799

(51) Int. Cl.
*H04W 48/14* (2009.01)
*H04W 36/00* (2009.01)
(Continued)

(52) U.S. Cl.
CPC ....... *H04W 48/14* (2013.01); *H04W 36/0077* (2013.01); *H04W 36/14* (2013.01); *H04W 88/06* (2013.01)

(58) Field of Classification Search
CPC . H04W 48/14; H04W 36/0077; H04W 36/14; H04W 88/06; H04W 76/15; H04W 72/04
See application file for complete search history.

(56) References Cited

U.S. PATENT DOCUMENTS

| 6,236,860 B1 | 5/2001 | Hagting et al. |
| 2011/0134774 A1 | 6/2011 | Pelletier et al. |

(Continued)

FOREIGN PATENT DOCUMENTS

| CN | 1200228 A | 11/1998 |
| CN | 104904254 A | 9/2015 |

(Continued)

OTHER PUBLICATIONS

Communication dated Nov. 15, 2019 from European Patent Office in counterpart EP Application No. 17890048.6.

(Continued)

*Primary Examiner* — Asghar H Bilgrami
(74) *Attorney, Agent, or Firm* — Sughrue Mion, PLLC

(57) ABSTRACT

A second RAN node (2) sends to a radio terminal (3), via a first RAN node (1), an indication of available on-demand system information that is available in a cell of the second RAN node (2). It is thus, for example, possible to enabling notifying a UE of an indication about on-demand system information available in a cell served by a secondary gNB of Inter-RAT dual connectivity between E-UTRA and NR, or available in a cell served by a target gNB of Inter-RAT handover from E-UTRA to NR.

10 Claims, 11 Drawing Sheets

(51) Int. Cl.
  *H04W 36/14* (2009.01)
  *H04W 88/06* (2009.01)
  *H04W 76/15* (2018.01)
  *H04W 72/04* (2009.01)

(56) References Cited

U.S. PATENT DOCUMENTS

| | | |
|---|---|---|
| 2015/0327094 A1 | 11/2015 | Lee et al. |
| 2015/0351139 A1 | 12/2015 | Zhang et al. |
| 2016/0128006 A1 | 5/2016 | Ji et al. |
| 2016/0234736 A1* | 8/2016 | Kubota ............... H04W 48/12 |
| 2016/0234759 A1 | 8/2016 | Kubota et al. |
| 2017/0331577 A1* | 11/2017 | Parkvall ............... H04L 5/1469 |
| 2018/0092085 A1* | 3/2018 | Shaheen ............... H04W 36/14 |
| 2018/0192438 A1* | 7/2018 | John Wilson ........... H04B 7/088 |
| 2019/0104449 A1* | 4/2019 | Oketani ............ H04W 36/0085 |
| 2019/0174554 A1* | 6/2019 | Deenoo ................. H04L 5/0098 |

FOREIGN PATENT DOCUMENTS

| | | |
|---|---|---|
| CN | 105306187 A | 2/2016 |
| WO | 2015/094914 A1 | 6/2015 |
| WO | 2016/195617 A1 | 12/2016 |

OTHER PUBLICATIONS

"3rd Generation Partnership Project; Technical Specification Group Services and System Aspects; Study on Architecture for Next Generation System (Release 14)", 3GPP Tr 23.799 V14.0.0, Dec. 2016, 1-522 pgs.

"3rd Generation Partnership Project; Technical Specification Group Radio Access Network; Study on New Radio Access Technology; Radio Access Architecture and Interfaces (Release 14)", 3GPP TR 38.801 vi.0.0, Dec. 2016, pp. 1-72.

NTT Docomo, Inc., "QoS and bearer for DC between LTE and NR", 3GPP TSG-RAN2#96, R2-168400, Nov. 12-18, 2016, pp. 1-3, Reno, USA.

Nokia et al., "EPC—NR PDCP interaction for tight interworking: User Plane aspects", 3GPP TSG-RAN WG2 Meeting #96, R2-168686, Nov. 14-18, 2016, 7 pgs., Reno, USA.

Catt, "On-demand system information delivery mechanism", 3GPP TSG-RAN WG2 Meeting #95bis, R2-166120, Oct. 10-14, 2016, pp. 1-6, Kaohsiung.

Huawei et al., "Delivery of "Other SI" in NR", 3GPP TSG-RAN2 Meeting #95bis, R2-166203, Oct. 10-14, 2016, 5 pgs., Kaohsiung.

Zte et al., "Consideration on the Minimum SI delivery in NR", 3GPP TSG-RAN WG2 Meeting #95bis, R2-166342, Oct. 10-14, 2016, 3 pgs., Kaohsiung.

Zte et al., "Consideration on the Other SI delivery in NR", 3GPP TSG-RAN WG2 Meeting #95bis, R2-166343, Oct. 10-14, 2016, 6 pgs., Kaohsiung.

NTT Docomo, Inc., "System Information handling for LTE-NR Dual Connectivity", 3GPP TSG-RAN WG2#96, R2-168091—Revision of R2-164950, Nov. 14-18, 2016, pp. 1-2, Reno, USA.

Samsung, "Comparison of index based approaches", 3GPP TSG-RAN WG2 Meeting #96, R2-168086, Nov. 14-18, 2016, 6 pgs., Reno, Nevada.

Samsung, "Essential System Information (SI) and on-demand SI", 3GPPTSG RAN WG1#87, RI-1612457, Nov. 14-18, 2016, 3pgs., Reno, USA.

International Search Report for PCT/JP2017/041823 dated, Feb. 20, 2018 (PCT/ISA/210).

Chinese Office Action for CN Application No. 201780088061.X dated Feb. 9, 2021 with English Translation.

Institute for Information Industry, "Discussion on System Information Delivery in NR", 3GPP TSG RAN WG1 meeting #86bis, R1-1610207, Lisbon, Portugal, Oct. 10-14, 2016.

Chinese Office Communication for CN Application No. 201780088061.X dated Aug. 11, 2021 with English Translation.

Cloud platform construction of Guizhou Power Grid CSGII system under the background of large concentration, China Computer &Communication, 2016, Jan. 23, 2016.

Japanese Office Action for JP Application No. 2020-116195 dated Nov. 2, 2021 with English Translation.

Nokia, Alcatel-Lucent Shanghai Bell, "Distribution of System Information in NR", 3GPP TSG-RAN WG2 Meeting #96, R2-168690, Nov. 5, 2016, USA.

* cited by examiner

RADIO ACCESS NETWORK NODE, RADIO TERMINAL, AND METHODS AND NON-TRANSITORY COMPUTER-READABLE MEDIA THEREFOR

CROSS REFERENCE TO RELATED APPLICATIONS

This application is a National Stage of International Application No. PCT/JP2017/041823 filed Nov. 21, 2017, claiming priority based on Japanese Patent Application No. 2017-000799, filed Jan. 5, 2017, the disclosures of which are incorporated herein in their entirety by reference.

TECHNICAL FIELD

The present disclosure relates to a radio communication system and, in particular, to communication in which a radio terminal simultaneously uses a plurality of cells of different Radio Access Technologies (RATs) operated by different radio stations.

BACKGROUND ART

The 3rd Generation Partnership Project (3GPP) has started in 2016 the standardization for the fifth generation mobile communication system (5G), i.e., 3GPP Release 14, to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the 5G-RAN, no bearers are used in the 5G-CN or in the interface between the 5G-CN and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. In the QoS framework of the 5G system, a PDU flow is identified by a PDU flow ID contained in a header encapsulating a Service Data Unit of a tunnel of a NG3 interface. The NG3 interface is a user plane interface between the 5G-CN and the gNB (i.e., 5G-RAN). Association between a 5G UE and a data network is referred to as a "PDU session". The term "PDU session" corresponds to the term "PDN connection" in LTE and LTE-Advanced. A plurality of PDU flows can be configured in one PDU session.

The PDU flow is also referred to as a "QoS flow". The QoS flow is the finest granularity in QoS treatment in the 5G system. User plane traffic having the same NG3 marking value in a PDU session corresponds to a QoS flow. The NG3 marking corresponds to the above-described PDU flow ID, and it is also referred to as a QoS flow ID or a Flow Identification Indicator (FII).

FIG. 1 shows a basic architecture of the 5G system. A UE establishes one or more Signalling Radio Bearers (SRBs) and one or more Data Radio Bearers (DRBs) with a gNB. The 5G-CN and the gNB establish a control plane interface and a user plane interface for the UE. The control plane interface between the 5G-CN and the gNB (i.e., RAN) is referred to as an NG2 interface or an NG-c interface and is used for transfer of Non-Access Stratum (NAS) information and for transfer of control information (e.g., NG2 AP Information Element) between the 5G-CN and the gNB. The user plane interface between the 5G-CN and the gNB (i.e., RAN) is referred to as an NG3 interface or an NG-u interface and is used for transfer of packets of one or more PDU flows in a PDU session of the UE.

Note that, the architecture shown in FIG. 1 is merely one of the 5G architecture options or deployment scenarios (see Annex J of Non-Patent Literature 1 and see Non-Patent Literature 2). The architecture shown in FIG. 1 is referred to as "Standalone NR (in NextGen System)" or "Option 2". In contrast, FIGS. 2 and 3 show architecture Options 3 and 3A, which are referred to as "Non-standalone NR in EPS". In FIGS. 2 and 3, control interfaces are shown as dashed lines, while user plane interfaces are shown as solid lines. Architecture Options 3 and 3A are Dual connectivity (DC) deployments including E-UTRA as the anchor RAT (or the primary RAT or the master RAT) and NR as a secondary RAT. In Options 3 and 3A, E-UTRA (LTE eNB) and NR (gNB) are connected to the EPC. The NR user plane connection to the EPC goes through the LTE eNB in Option 3, whereas in Option 3A, it passes directly through a user plane interface between the gNB and the EPC.

Non-Patent Literature 3 has suggested that in Architecture Options 3 and 3A, which are DC architecture where E-UTRA and NR are connected to the EPC, the NR gNB supports the LTE DC functionalities and procedures. Non-Patent Literature 3 has also suggested that in the DC architecture where E-UTRA and NR are connected to the EPC, the NR gNB applies the LTE QoS framework (i.e., bearer based QoS) to the EPC, the LTE eNB and the UE. Further, Non-Patent Literature 3 has suggested the following proposals:

LTE DC procedures (e.g., SeNB addition) are applied when adding NR gNB as secondary node, in which necessary QoS service (i.e., bearer) are configured;

E-UTRAN Radio Access Bearer (E-RAB) is established between EPC and NR gNB for Secondary Cell Group (SCG) bearer option according to LTE;

X2-U is established between LTE eNB and NR gNB for split bearer option according to LTE; and DRB is established between NR gNB and UE according to SCG bearer option or split bearer option according to LTE.

Non-Patent Literature 4 has suggested that there is one-to-one mapping (1:1 mapping) between S1-U and DRB of SCG (i.e., SCG bearer). Non-Patent Literature 4 has also suggested that QoS attributes of EPC are in use for EPS bearers and, accordingly, there is a need to map the QoS parameters used in EPC to the radio bearer parameters used in the NR.

Further, in the 5G system, the system information includes system information that is always broadcast and system information that is not always broadcast. The system information that is always broadcast is referred to as "Minimum SI" or "Essential SI". Meanwhile, the system information that is not always broadcast is referred to as "Other SI" or "On-demand SI". The Minimum SI needs to be periodically broadcast in a cell. The Minimum SI is supposed to include at least information for assisting cell selection, information for acquiring On-demand SI, and information for accessing the cell. The term "Other SI" indicates all kinds of system information that are not broadcast in the Minimum SI. A part or all of the Other SI corresponds to the On-demand SI. The On-demand SI is transmitted by the gNB after it has been triggered by a UE or a network. In other words, in response to an SI request from a UE, the gNB sends an SI response containing requested system information to the UE.

There are several proposals regarding a distribution mechanism of Other SI (or On-demand SI) (see, for example, Non-Patent Literature 5-8). The SI request from the UE may be transmitted via the first message (Msg1) (i.e., random access preamble) of the random access procedure, via the third message (Msg3) of the random access procedure, or via dedicated Radio Resource Control (RRC) signalling after an RRC connection has been established. The transmission of the SI response by the gNB may be a unicast for the UE that has made the request, a group-cast for a group of UEs including the UE that has made a request, or a non-periodic broadcast. In the case of unicasting the SI response, the SI response containing the Other SI (or On-demand SI) may be transmitted via the second message (Msg2) (i.e., random access response (RAR)) of the random access procedure, via the fourth message (Msg3) of the random access procedure, or via dedicated Radio Resource Control (RRC) signalling after an RRC connection has been established. In the case of the group-cast or non-periodic broadcast of the SI response, a paging mechanism may be used, and the SI response containing the Other SI (or On-demand SI) may be broadcast in a paging occasion determined based on an identifier (e.g., Paging Radio Network Temporary Identifier (P-RNTI)) of the UE or the UE group.

CITATION LIST

Non Patent Literature

[Non-Patent Literature 1] 3GPP TR 23.799 V14.0.0 (2016-12) "3rd Generation Partnership Project; Technical Specification Group Services and System Aspects; Study on Architecture for Next Generation System (Release 14)", December 2016

[Non-Patent Literature 2] 3GPP TR 38.801 V1.0.0 (2016-12) "3rd Generation Partnership Project; Technical Specification Group Radio Access Network; Study on New Radio Access Technology; Radio Access Architecture and Interfaces (Release 14)", December 2016

[Non-Patent Literature 3] 3GPP R2-168400, NTT DOCOMO, INC., "QoS and bearer for DC between LTE and NR", 3GPP TSG-RAN WG2 Meeting #96, Reno, USA, 14-18 Nov. 2016

[Non-Patent Literature 4] 3GPP R2-168686, Nokia, Alcatel-Lucent Shanghai Bell, "EPC-NR PDCP interaction for tight interworking: User Plane aspects", 3GPP TSG-RAN WG2 Meeting #96, Reno, USA, 14-18 Nov. 2016

[Non-Patent Literature 5] 3GPP R2-166120, China Academy of Telecommunications Technology (CATT), "On-demand system information delivery mechanism", 3GPP TSG-RAN WG2 Meeting #95 bis, Kaohsiung, 10-14 Oct. 2016

[Non-Patent Literature 6] 3GPP R2-166203, Huawei, HiSilicon, "Delivery of "Other SI" in NR", 3GPP TSG-RAN WG2 Meeting #95 bis, Kaohsiung, 10-14 Oct. 2016

[Non-Patent Literature 7] 3GPP R2-166342, ZTE, ZTE Microelectronics, "Consideration on the Other SI delivery in NR", 3GPP TSG-RAN WG2 Meeting #95 bis, Kaohsiung, 10-14 Oct. 2016

[Non-Patent Literature 8] 3GPP R2-166343, ZTE, ZTE Microelectronics, "Consideration on the Other SI delivery in NR", 3GPP TSG-RAN WG2 Meeting #95 bis, Kaohsiung, 10-14 Oct. 2016

SUMMARY OF INVENTION

Technical Problem

The present inventors have studied interworking between E-UTRA and NR and found several problems. In E-UTRA- NR Dual Connectivity (DC) architecture in which E-UTRA and NR are connected to the EPC (i.e., architecture options 3 and 3A), the Secondary gNB (SgNB) serving as the secondary node supports Other-SI (or On-demand SI) distribution described above. However, it is not clear how UEs know which Other SI (or On-demand SI) is available in the SgNB of E-UTRA-NR DC.

This problem regarding the Other SI (or On-demand SI) may occur also in other E-UTRA-NR DC architecture options (e.g., architecture options 7 and 7A). The architecture options 7 and 7A are Dual connectivity (DC) deployments including E-UTRA serving as the anchor RAT (or the primary RAT or the master RAT) and NR serving as the secondary RAT. In the options 7 and 7A, E-UTRA (LTE eNB) and NR (gNB) are connected to the 5G-CN. The NR user plane connection to the 5G-CN goes through the LTE eNB in the option 7, whereas it directly passes through the user plane interface between the gNB and the 5G-CN in the option 7A. In the options 7 and 7A as well, it is not clear how UEs know which Other SI (or On-demand SI) is available in the SgNB when the SgNB supports the Other SI (or On-demand SI) distribution.

Further, problems similar to the above ones regarding the Other SI (or On-demand SI) may occur also in Inter-RAT handovers from E-UTRA to NR. Specifically, when a UE is handed over from a source LTE eNB to a target gNB that supports the Other SI (or On-demand SI) distribution, it is not clear how the UE knows which Other SI (or On-demand SI) is available in the target NR cell.

Accordingly, one of the objects to be attained by embodiments disclosed herein is to provide an apparatus, a method, and a program that enable notifying a UE of an indication about on-demand system information available in a cell served by a secondary gNB of Inter-RAT dual connectivity between E-UTRA and NR, or available in a cell served by a target gNB of Inter-RAT handover from E-UTRA to NR. It should be noted that this object is merely one of the objects to be attained by the embodiments disclosed herein. Other objects or problems and novel features will be made apparent from the following description and the accompanying drawings.

Solution to Problem

In a first aspect, a second radio access network (RAN) node is used in a radio communication system. The second RAN node includes a memory and at least one processor coupled to the memory. The at least one processor is configured to send to a radio terminal, via a first RAN node, an indication of available on-demand system information that is available in a cell of the second RAN node. The available on-demand system information is to be transmitted in the cell of the second RAN node, or transmitted via the first RAN node, in response to a request from the radio terminal.

In a second aspect, a first radio access network (RAN) node is used in a radio communication system. The first RAN node includes a memory and at least one processor coupled to the memory. The at least one processor is configured to: receive from a second RAN node an indication of available on-demand system information that is available in a cell of the second RAN node; and transmit the indication to a radio terminal in a cell of the first RAN node. The available on-demand system information is to be transmitted in the cell of the second RAN node, or transmitted via the first RAN node, in response to a request from the radio terminal.

In a third aspect, a radio terminal is used in a radio communication system. The radio terminal includes at least one wireless transceiver and at least one processor. The at least one wireless transceiver is configured to communicate with a first radio access network (RAN) node and a second RAN node. The at least one processor is configured to receive from the second RAN node, via the first RAN node, an indication of available on-demand system information that is available in a cell of the second RAN node. The available on-demand system information is to be transmitted in the cell of the second RAN node, or transmitted via the first RAN node, in response to a request from the radio terminal.

In a fourth aspect, a method for a second radio access network (RAN) node includes sending to a radio terminal, via a first RAN node, an indication of available on-demand system information that is available in a cell of the second RAN node. The available on-demand system information is to be transmitted in the cell of the second RAN node, or transmitted via the first RAN node, in response to a request from the radio terminal.

In a fifth aspect, a method for a first radio access network (RAN) node includes: receiving from a second RAN node an indication of available on-demand system information that is available in a cell of the second RAN node; and transmitting the indication to a radio terminal in a cell of the first RAN node. The available on-demand system information is to be transmitted in the cell of the second RAN node, or transmitted via the first RAN node, in response to a request from the radio terminal.

In a sixth aspect, a method for a radio terminal includes receiving from a second radio access network (RAN) node, via a first RAN node, an indication of available on-demand system information that is available in a cell of the second RAN node. The available on-demand system information is to be transmitted in the cell of the second RAN node, or transmitted via the first RAN node, in response to a request from the radio terminal.

In a seventh aspect, a program includes instructions (software codes) that, when loaded into a computer, cause the computer to perform the method according to the above-described fourth, fifth, or sixth aspect.

Advantageous Effects of Invention

According to the above-deceived aspects, it is possible to provide an apparatus, a method, and a program that enable notifying a UE of an indication about on-demand system information available in a cell served by a secondary gNB of Inter-RAT dual connectivity between E-UTRA and NR, or available in a cell served by a target gNB of Inter-RAT handover from E-UTRA to NR.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on DC architecture where E-UTRA and NR are connected to EPC. However, these embodiments may be applied to other radio communication systems supporting DC architecture where different RATs using different QoS frameworks are connected to a common core network.

First Embodiment

Figure 1:
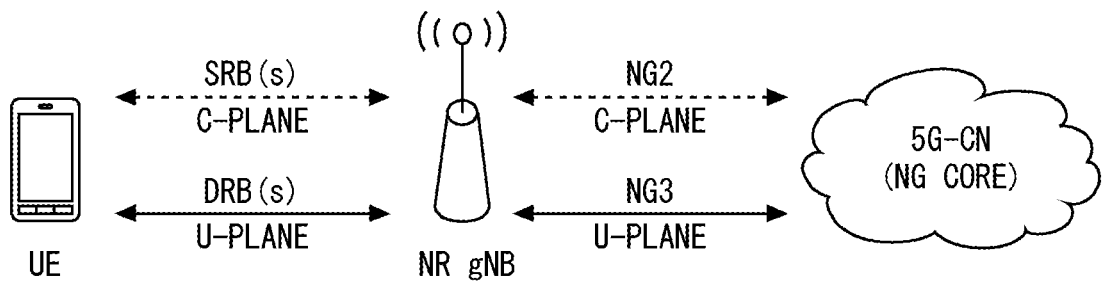
FIG. 1 is a diagram showing basic architecture of the 5G System according to the Background Art.
Figure 2:
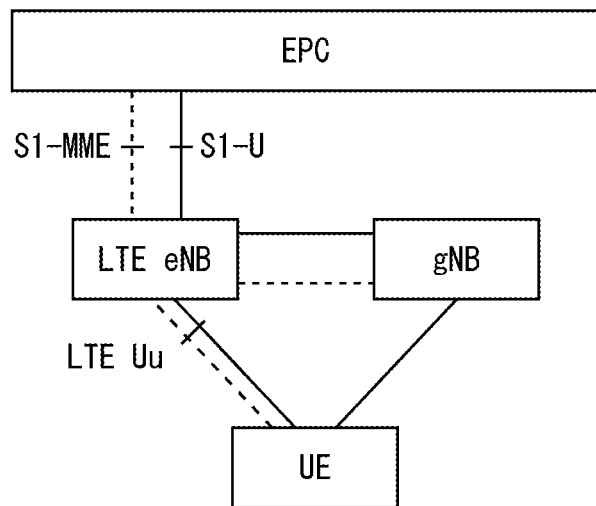
FIG. 2 is a diagram showing Architecture Option 3 for Dual Connectivity where E-UTRA (LTE eNB) and NR (gNB) are connected to EPC, according to the Background Art.
Figure 3:
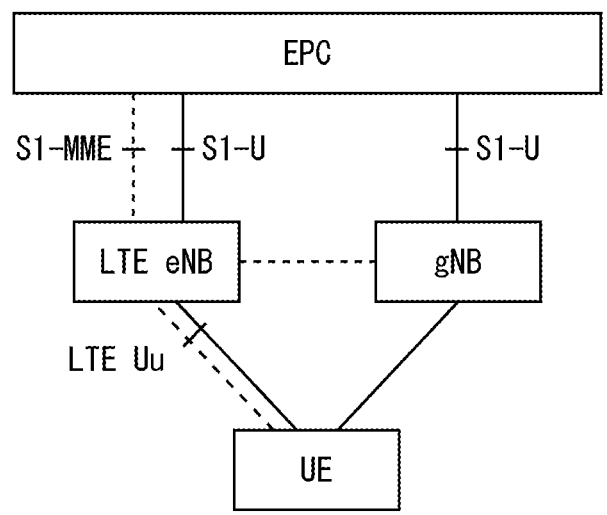
FIG. 3 is a diagram showing Architecture Option 3A for Dual Connectivity where E-UTRA (LTE eNB) and NR (gNB) are connected to EPC, according to the Background Art.
Figure 4:
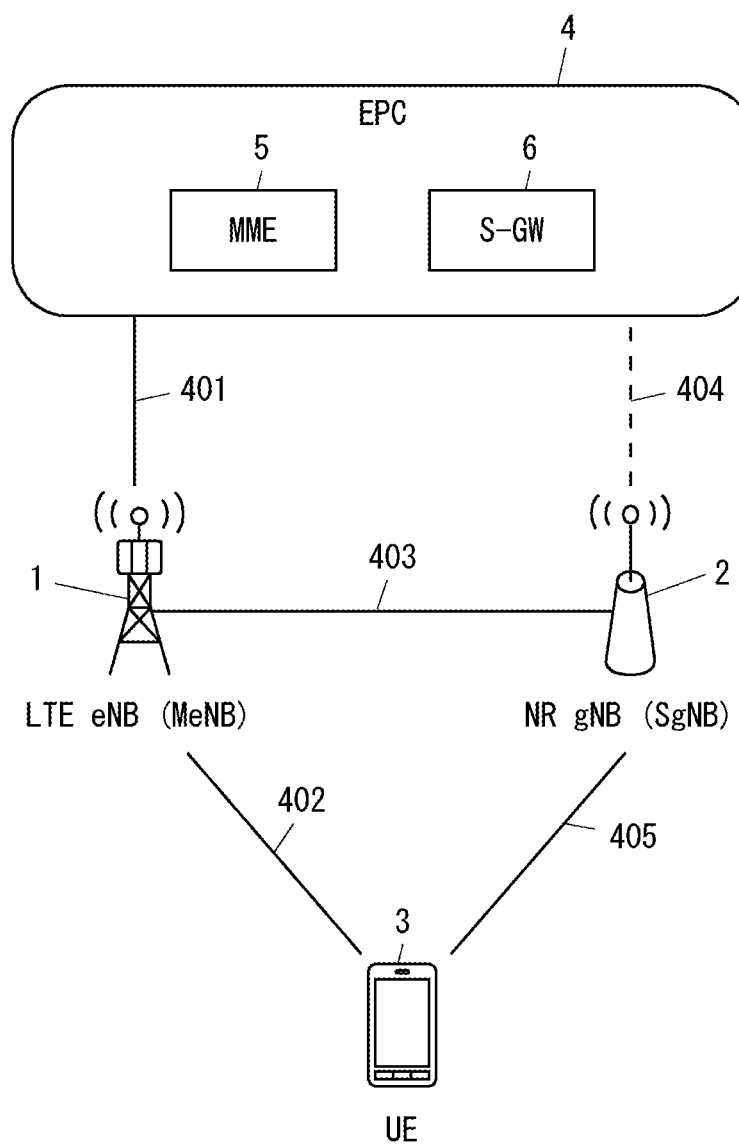
FIG. 4 is a diagram showing one configuration example of a radio communication network according to a plurality of embodiments.

FIG. 4 shows a configuration example of a radio communication network according to a plurality of embodiments including this embodiment. In the example shown in FIG. 4, the radio communication network includes an LTE eNB 1, an NR gNB 2, a UE 3, and an EPC 4. The radio communication network shown in FIG. 4 supports dual connectivity (DC) and also supports one or both of the above-described option 3 and option 3A. The options 3 and 3A support dual connectivity involving E-UTRA and NR, which are an anchor RAT (or a primary RAT) and a secondary RAT, respectively. In the options 3 and 3A, both E-UTRA (i.e., the LTE eNB 1) and NR (i.e., the gNB 2) are connected to the EPC 4. In the option 3, the NR user plane connection to the EPC 4 goes through the LTE eNB 1, and accordingly user packets of the UE 3 are transferred via an inter-base station interface 403 and via an interface 401 between the eNB 1 and the EPC. In contrast, in the option 3A, the NR user plane connection to the EPC 4 directly passes through a user plane interface 404 between the gNB 2 and the EPC 4.

The UE 3 has a capability to simultaneously communicate with the eNB 1 associated with the primary RAT (E-UTRA) and the gNB 2 associated with the secondary RAT (NR). In other words, the UE 3 has a capability to aggregate a cell of the eNB 1 associated with the primary RAT (E-UTRA) with a cell of the gNB 2 associated with the secondary RAT (NR). Further, in other words, the UE 3 has a capability to be configured with both a cell of the eNB 1 associated with the primary RAT (E-UTRA) and a cell of the gNB 2 associated with the secondary RAT (NR). In the architecture options 3 and 3A, an air interface 402 between the eNB 1 and the UE 3 provides a control plane connection and a user plane connection. Meanwhile, an air interface 405 between the gNB 2 and the UE 3 includes at least a user plane connection, but it does not need to include a control plane connection. In the DC architecture in which E-UTRA and NR are connected to the EPC 4, the master eNB (MeNB) 1 provides one or more E-UTRA MCG cells for the UE 3, while the secondary gNB (SgNB) 2 provides one or more NR SCG cells for the UE 3.

The EPC 4 includes a plurality of core network nodes including an MME 5 and an S-GW 6. The MME 5 is a control plane node while the S-GW 6 is a user plane node. The MME 5 performs mobility management and bearer management of UEs that have already attached to the core network (i.e., UEs in EMM-REGISTERED state). The mobility management is used to keep track of the current position of each UE and includes maintaining a mobility management context (MM context) regarding each UE. The bearer management includes controlling establishment of an EPS bearer for enabling each UE to communicate with an external network (Packet Data Network (PDN)) through E-UTRAN including the eNB 1 and through the EPC 4, and maintaining an EPS bearer context regarding each UE. The S-GW 6 is a gateway with E-UTRAN and is connected via an S1-U interface to one or both of the eNB 1 and the gNB 2.

The radio communication network according to a plurality of embodiments including this embodiment may not support the architecture options 3 and 3A. The radio communication network may instead support other E-UTRA-NR DC architecture options (e.g., architecture options 7 and 7A). Additionally or alternatively, the radio communication network may support Inter-RAT handover from E-UTRA to NR.

Figure 5:
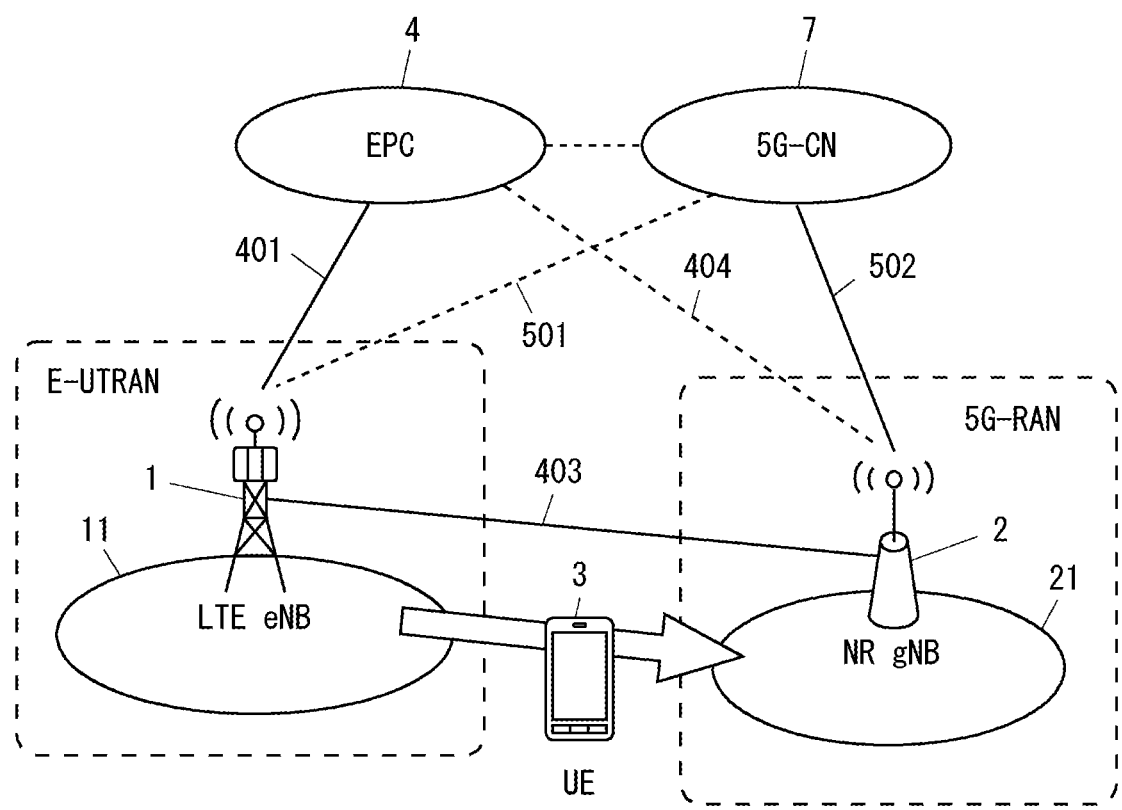
FIG. 5 is a diagram showing another configuration example of a radio communication network according to a plurality of embodiments.

FIG. 5 shows another configuration example of a radio communication network according to a plurality of embodiments including this embodiment. In one example, this radio communication network may provide the E-UTRA-NR DC architecture option 7 or 7A. In the options 7 and 7A, E-UTRA (LTE eNB 1) and NR (gNB 2) are connected to the 5G-CN 7. In the option 7, the NR user plane connection to the 5G-CN 7 goes through the LTE eNB 1, and accordingly user packets of the UE 3 are transferred via an inter-base station interface 403 and via an interface 501 between the eNB 1 and the 5G-CN 7. In contrast, in the option 7A, the NR user plane connection to the 5G-CN 7 directly passes through a user plane interface 502 between the gNB 2 and the 5G-CN 7.

Additionally or alternatively, the radio communication network shown in FIG. 5 may support Inter-RAT handovers from an E-UTRA cell 11 of the LTE eNB 1 to an NR cell 21 of the NR gNB 2.

The following describes a procedure for notifying the UE 3 of an indication about on-demand system information available in the cell 21 served by the gNB 2 relating to Inter-RAT dual connectivity between E-UTRA and NR and an Inter-RAT handover from E-UTRA to NR. As already described above, the on-demand system information (On-demand SI) corresponds to a part or all of the Other SI.

Figure 6:
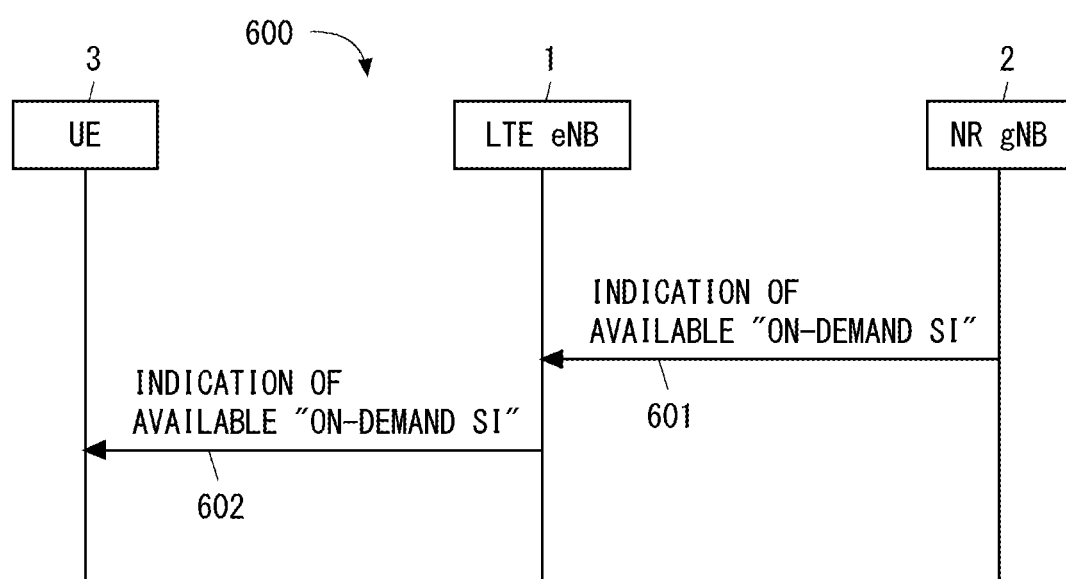
FIG. 6 is a diagram showing one example of a procedure for sending to a UE an indication about available on-demand system information according to a first embodiment.

FIG. 6 is a diagram showing a process 600 that is one example of a procedure for sending to a UE an indication of on-demand system information available in the cell of the SgNB 2. The gNB 2 operates to send to the UE 3, via the eNB 1, an indication of on-demand system information available in the cell 21 of the gNB 2. This indication may be an indication list or an indication bitmap indicating numbers (e.g., SIB numbers), identifiers (e.g., SI group identities), types (e.g., SIB types), or categories (e.g., SI categories) of the available on-demand system information. Additionally or alternatively, this indication may be scheduling information regarding the available on-demand system information, or information regarding radio resources to be used for requesting each of the on-demand system information items. Further, this indication may be a combination of them. For example, this indication may include both the scheduling information for on-demand system information that is already being transmitted (or is going to be transmitted) as the system information and an indication list (or indication bitmap) for on-demand system information that is not being transmitted as the system information. The on-demand system information is to be transmitted in the cell 21 of the gNB 2 in response to a request from the UE 3 or in response to being triggered by the network (e.g., gNB). The UE 3 can use the indication to determine whether on-demand system information (i.e., at least a part of the Other SI) desired (or intended) by the UE 3 is available in the cell 21 of the gNB 2.

Specifically, in Step 601, the gNB 2 sends to the eNB 1 the indication of on-demand system information available in the cell 21 of the gNB 2. For example, the gNB 2 may send a control message containing the indication of the available on-demand system information to the eNB 1 via an inter-base station interface (e.g., Xn interface) between the eNB 1 and the gNB 2.

In Step 602, the eNB 1 receives the indication of the available on-demand system information from the gNB 2 and transmits the received indication to the UE 3 in the cell 11 of the eNB 1. For example, the eNB 1 may transmit an RRC message including the received indication to the UE 3 via an RRC connection between the eNB 1 and the UE 3 in the cell 11 (i.e., a Primary Cell (PCell) or a Source cell) of the eNB 1.

The procedure shown in FIG. 6 allows the UE 3 to receive, from the eNB 1 of the first RAT (i.e., E-UTRA), the indication of on-demand system information available in the cell 21 of the gNB 2 of the second RAT (i.e., NR).

Figure 7:
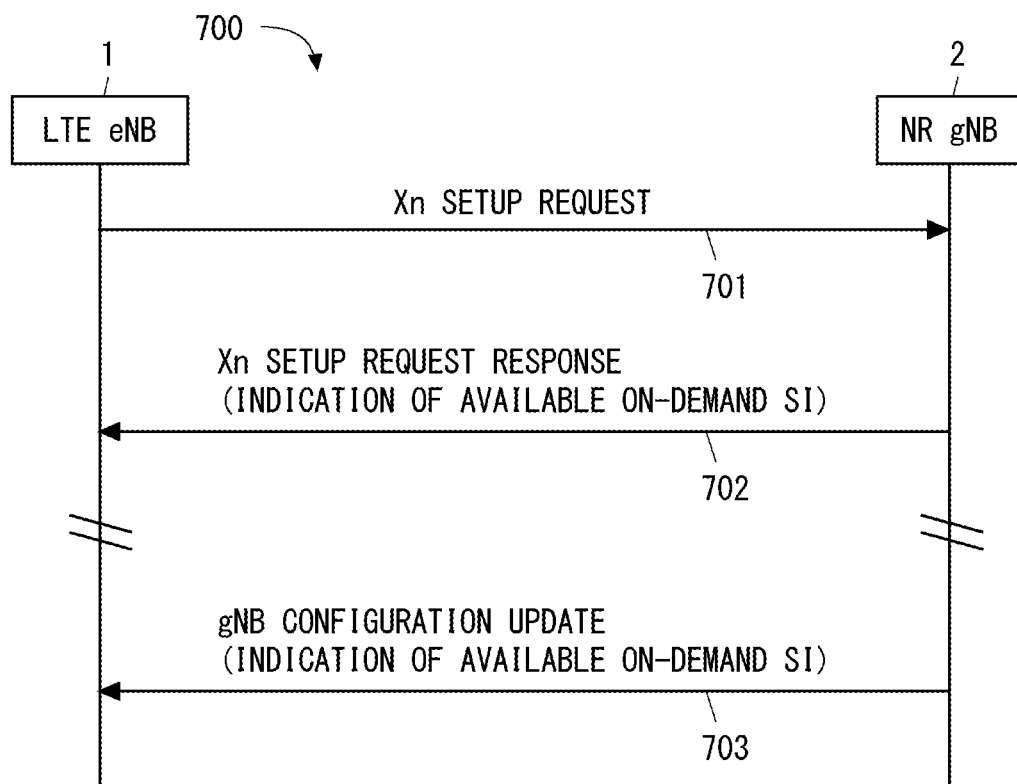
FIG. 7 is a diagram showing one example of a procedure for sending to a UE an indication about available on-demand system information according to the first embodiment.
Figure 8:
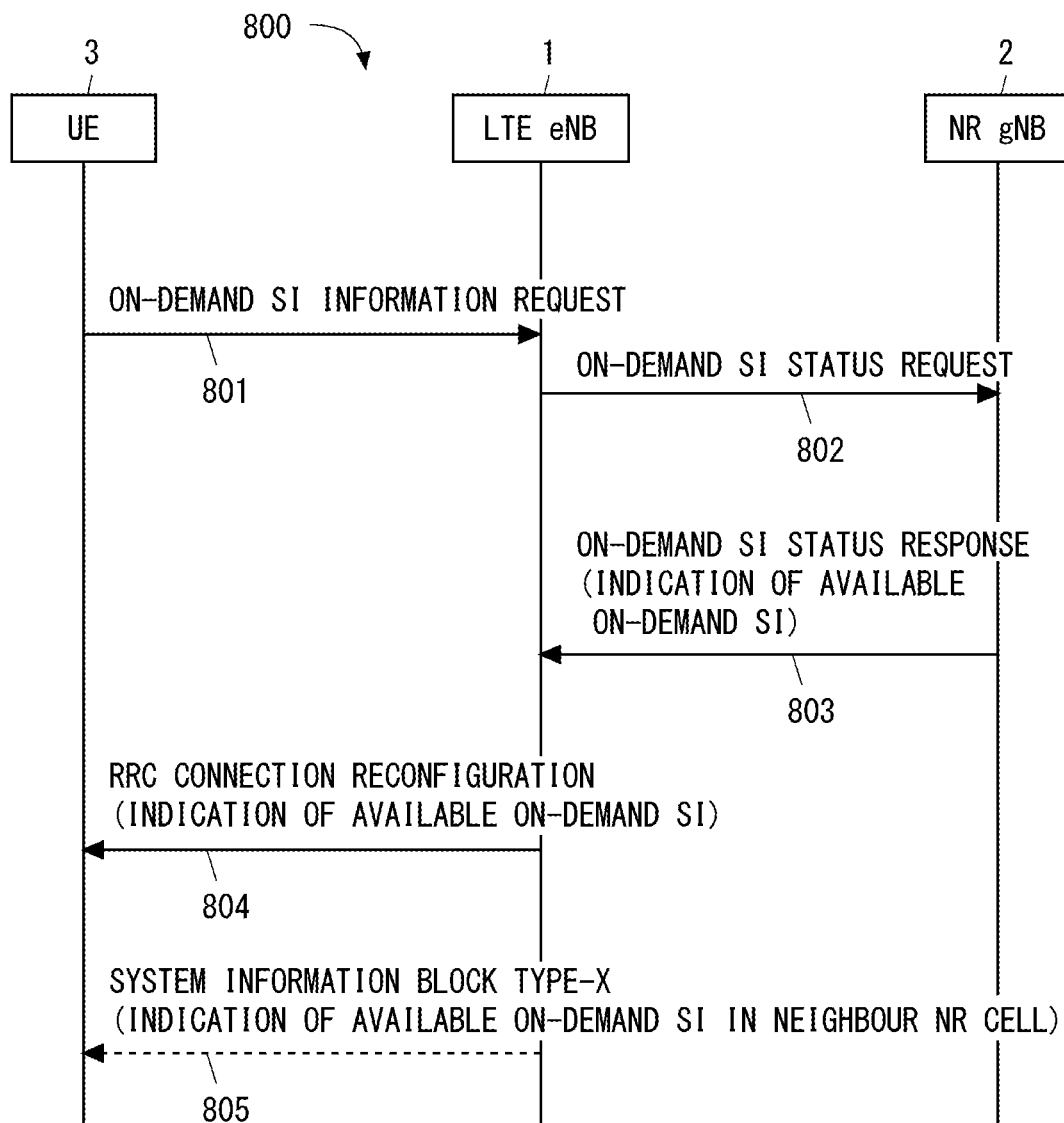
FIG. 8 is a diagram showing one example of a procedure for sending to a UE an indication about available on-demand system information according to the first embodiment.

In place of the procedure shown in FIG. 6, by the procedure shown in FIG. 7 or 8, the eNB 1 may receive the indication of on-demand system information available in the cell 21 of the gNB 2 and then the eNB 1 may transmit this indication to the UE 3.

FIG. 7 shows an example where the eNB 1 receives the indication of on-demand system information available in the cell 21 of the gNB 2 during a procedure for establishing a direct interface (e.g., Xn) with the gNB 2. In Step 701, the eNB 1 sends to the gNB 2 a request for establishment of an Xn interface (e.g., Xn Setup Request message). In Step 702, the gNB 2 sends to the eNB 1 a response (e.g., Xn Setup Request Response message) to the request for establishment of the Xn interface. At this time, the gNB 2 sends to the eNB 1 the indication of on-demand system information available in the cell 21. Further, in Step 703, when the gNB 2 changes its configuration (e.g., availability of the on-demand system information), the gNB 2 may send the updated indication to the eNB 1 via a message for informing the eNB 1 of this change (e.g., gNB Configuration Update message).

FIG. 8 shows an example where, in response to a request from the UE 3, the eNB 1 requests the gNB 2 to send an indication of on-demand system information available in the cell 21. In Step 801, the UE 3 transmits to the eNB 1 a message (e.g., On-Demand SI information Request message) for requesting the gNB 2 to send an indication of on-demand system information available in the cell 21. This message may be an explicit message or may be an implicit message (e.g., measurement reporting for Cell 21). In Step 802, the eNB 1 sends a UE-associated message (e.g., On-Demand SI Status Request message) for requesting the indication from the gNB 2. In Step 803, the gNB 2 sends a message including this indication (e.g., On-Demand SI Status Response message) to the eNB 1 in response to the UE associated message of Step 802. In Step 804, the eNB 1 transmits this indication to the UE 3 via dedicated signalling (e.g., RRC Connection Reconfiguration message including indication of available On-demand SI). The eNB 1 may transmit this indication in the cell 11 as system information (e.g., System Information Block type-X including indication of available On-demand SI in neighbour NR cell) (Step 805). These procedures allow the eNB 1 and the UE 3 to receive the indication of on-demand system information available in the cell 21 of the gNB 2. The indication of on-demand system information available in the cell 21 may be transmitted from the gNB 2 to the eNB 1 as an information element (e.g., RRC container) of the RRC layer or may be transmitted as an information element of the Xn protocol layer (e.g., Xn Information Element).

Second Embodiment

A configuration example of a radio communication network according to this embodiment is similar to that shown in FIG. 4 or 5. This embodiment provides a specific example of a procedure for sending an indication of on-demand system information available in the cell 21 of the secondary gNB (SgNB) 2, from the SgNB 2 to the UE 3 via the master eNB (MeNB) 1 in Inter-RAT dual connectivity that uses E-UTRA as the primary RAT and uses NR as the secondary RAT.

In this embodiment, the MeNB 1 and the SgNB 2 may support the E-UTRA-NR DC architecture option 3 or 3A. That is, the MeNB 1 and the SgNB 2 may be connected to the EPC 4. Alternatively, the MeNB 1 and the SgNB 2 may support the E-UTRA-NR DC architecture option 7 or 7A. That is, the MeNB 1 and the SgNB 2 may be connected to the 5G-CN 7.

The SgNB 2 according to this embodiment is configured to send a first Radio Resource Control (RRC) message including a configuration of an NR DRB to the UE 3, via the MeNB 1, during a procedure for configuring an NR DRB for E-UTRA-NR DC. This first RRC message further includes an indication of on-demand system information available in a cell of the SgNB 2. This indication indicates at least the on-demand system information available in a cell of the SgNB 2 in which the NR DRB for the UE 3 is to be configured. The MeNB 1 is configured to forward the first RRC message received from the SgNB 2 to the UE 3 in a cell (e.g., PCell) of the MeNB 1. This allows the UE 3 to know which on-demand system information (i.e., at least a part of the Other SI) is available in the cell of the SgNB 2, during the procedure for configuring an NR DRB for E-UTRA-NR DC.

Figure 9:
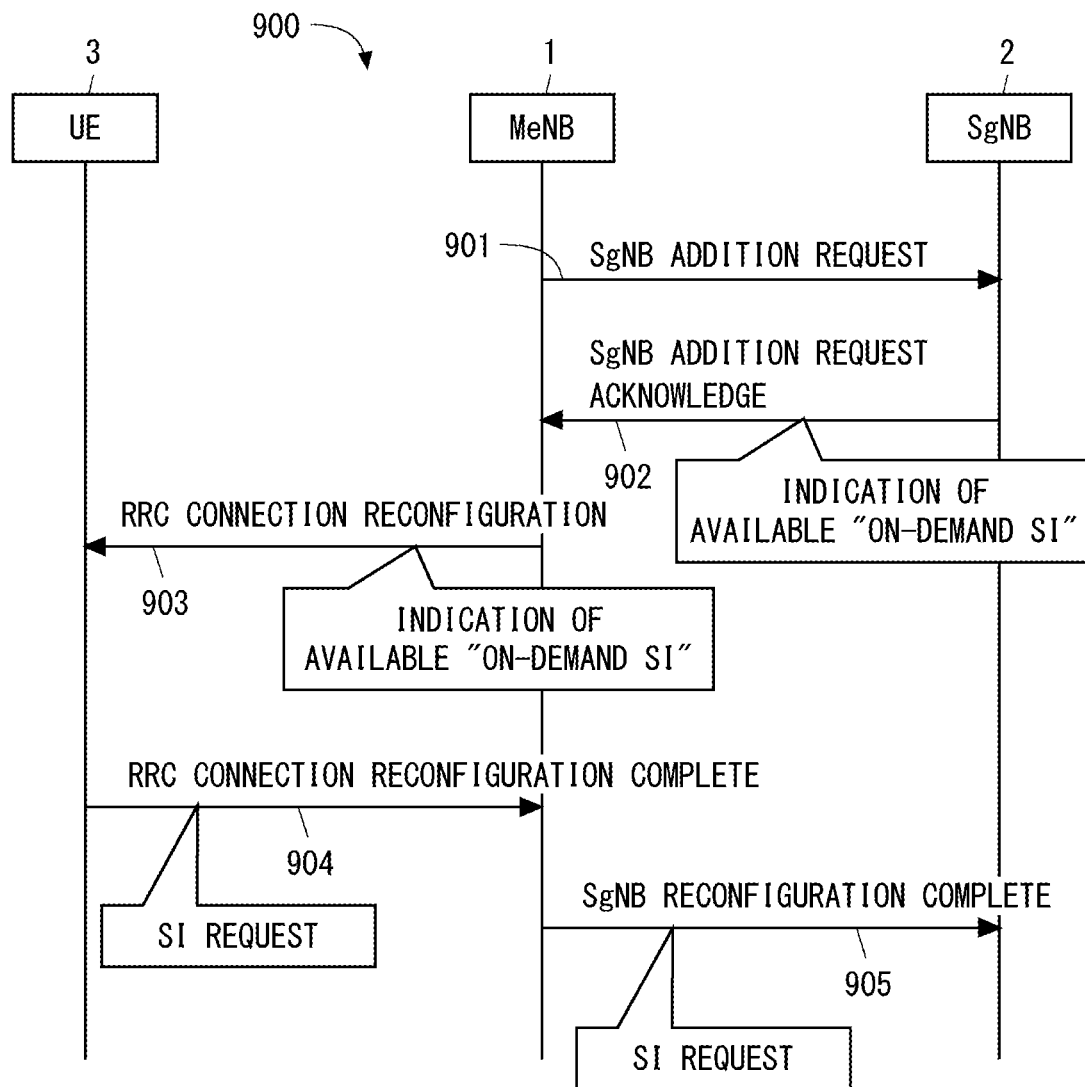
FIG. 9 is a sequence diagram showing an example of an SCG establishment procedure according to a second embodiment.

FIG. 9 shows a process 900 that is one example of an SCG establishment procedure for configuring the UE 3 with an NR data radio bearer (NR DRB) of a cell of the SgNB 2. The procedure shown in FIG. 9 basically follows the SeNB Addition procedure in LTE DC. In the procedure shown in FIG. 9, the UE 3 receives the indication of on-demand system information available in the cell of the SgNB 2, while performing the SCG establishment procedure (i.e., procedure for configuring the NR DRB).

In Step 901, the MeNB 1 sends an SgNB Addition Request message to the SgNB 2. The SgNB Addition Request message requests the SgNB 2 to configure a radio bearer (i.e., SCG DRB or Split DRB) for DC that uses E-UTRA and NR as respectively the primary RAT and the secondary RAT. Specifically, the SgNB Addition Request message includes an "SgNB Security Key (for SCG bearer)" information element (IE), an "E-RAB To Be Added List" IE, and an "MeNB to SgNB Container" IE. The "E-RAB To Be Added List" IE includes an E-RAB ID and E-RAB Level QoS Parameters of each E-RAB required by the MeNB 1 to be established. The "MeNB to SgNB Container" IE includes an RRC: SCG-ConfigInfo message. The RRC: SCG-ConfigInfo message is used by the MeNB in order to request the SgNB to establish, modify, or release an SCG. The SCG-ConfigInfo message includes, for example, an EPS bearer Identity, a DRB Identity, and a DRB type. The security policy (e.g., security algorithm) used in a cell (e.g., radio link, AS layer) of the secondary RAT (NR) may be different from that used in a cell (e.g., radio link, AS layer) of the primary RAT (E-UTRA). In this case, the SgNB Security Key IE may include information regarding the security policy used in a cell of the secondary RAT (NR). Further, the SgNB 2 may include this security policy-related information into an RRC: SCG-Config message to be transmitted to the UE 3.

In Step 902, the SgNB 2 sends an SgNB Addition Request Acknowledge message to the MeNB 1. The SgNB Addition Request Acknowledge message is a response message to the SgNB Addition Request message. Specifically, the SgNB Addition Request Acknowledge message includes an "E-RAB Admitted To Be Added List" IE and an "SgNB to MeNB Container" IE. The "SgNB to MeNB Container" IE includes an RRC: SCG-Config message. The RRC: SCG-Config message corresponds to the "first RRC message" described above. The RRC: SCG-Config message is used to transfer a radio resource configuration of an SCG DRB (or Split DRB) created by the SgNB 2. The RRC: SCG-Config message further contains the indication of on-demand system information available in a cell of the gNB 2 in which the NR DRB for the UE 3 is to be configured. The RRC: SCG-Config message further contains Minimum SI of a cell of the SgNB 2.

In Step 903, the MeNB 1 sends an RRC Connection Reconfiguration message to the UE 3 in response to receiving the SgNB Addition Request Acknowledge message from the SgNB 2. This RRC Connection Reconfiguration message includes the RRC: SCG-Config message, which has been sent from the SgNB 2 to the MeNB 1 via the SgNB Addition Request Acknowledge message. An AS layer of the primary RAT (i.e., E-UTRA (LTE)) in the UE 3 receives this RRC Connection Reconfiguration message in an E-UTRA cell (i.e., Primary Cell (PCell)) of the MeNB 1. An AS layer of the secondary RAT (i.e., NR) in the UE 3 configures an SCG DRB or an Split DRB in an NR cell of the SgNB 2 in accordance with the RRC: SCG-Config message.

The UE 3 (i.e., the NR AS layer) further checks the "indication of available On-demand SI" retrieved from the RRC: SCG-Config message and determines whether the Other SI desired (or intended) by the UE 3 is available in the cell of the SgNB 2. In the example shown in FIG. 9, the UE 3 (i.e., the E-UTRA AS layer) sends an RRC Connection Reconfiguration Complete message that includes an SI request in the E-UTRA cell (i.e., Primary Cell (PCell)) of the MeNB 1 (Step 904). The SI request is a request for transmission of the on-demand system information from the SgNB 2. The MeNB 1 forwards the SI request received from the UE 3 to the SgNB 2. The MeNB 1 may send to the SgNB 2 an SgNB Reconfiguration Complete message including the SI request (Step 905).

The transmission of the SI request in Steps 904 and 905 of FIG. 9 is one example. The UE 3 (i.e., the NR AS layer) starts a random access procedure in a cell (e.g., Primary Secondary Cell (PSCell)) of the SgNB 2 after receiving the RRC Connection Reconfiguration message (Step 903) to synchronize with the cell of the SgNB 2. In some implementations, the UE 3 (i.e., the NR AS layer) may transmit the SI request in this random access procedure. For example, the UE 3 may transmit the SI request via the first message (Msg1) (i.e., random access preamble) of the random access procedure. In this case, the UE 3 may select, from a preamble pool, a random access preamble associated with the number or identifier of the On-demand SI (Other SI) that the UE 3 desires and then transmit the selected preamble. Alternatively, the UE 3 may transmit the SI request via the third message (Msg3) of the random access procedure.

Alternatively, in some implementations, after completing the configuration of the SCG DRB (or Split DRB), the UE 3 (i.e., the NR AS layer) may transmit the SI request via RRC signalling or via a Medium Access Control (MAC) Control Element (CE) in the cell of the SgNB 2 (e.g., PSCell).

Alternatively, in some implementations, after completing the configuration of the SCG DRB (or Split DRB), the UE 3 (i.e., the E-UTRA AS layer) may transmit the SI request to the MeNB 1 via RRC signalling in the cell of the MeNB 1 (e.g., PCell), and the MeNB 1 may forward the received SI request to the SgNB 2.

Third Embodiment

A configuration example of a radio communication network according to this embodiment is similar to that shown in FIG. 5. This embodiment provides a specific example of a procedure for sending an indication of on-demand system information available in the cell 21 of the target gNB 2, from the target gNB 2 to the UE 3 via the source eNB 1 in an Inter-RAT handover from E-UTRA to NR.

The target gNB 2 according to this embodiment is configured to send an RRC message including an NR radio resource configuration to the UE 3, via the source eNB 1, during an Inter-RAT handover procedure from E-UTRA to NR. This RRC message further includes an indication of on-demand system information available in a cell of the target gNB 2. This indication indicates at least the on-demand system information available in a cell of the target gNB 2. The source eNB 1 is configured to forward the RRC message received from the target gNB 2 to the UE 3 in a cell of the source eNB 1. This allows the UE 3 to know which on-demand system information (i.e., at least a part of the Other SI) is available in the cell of the target gNB 2, during the handover procedure to the target gNB 2.

Figure 10:
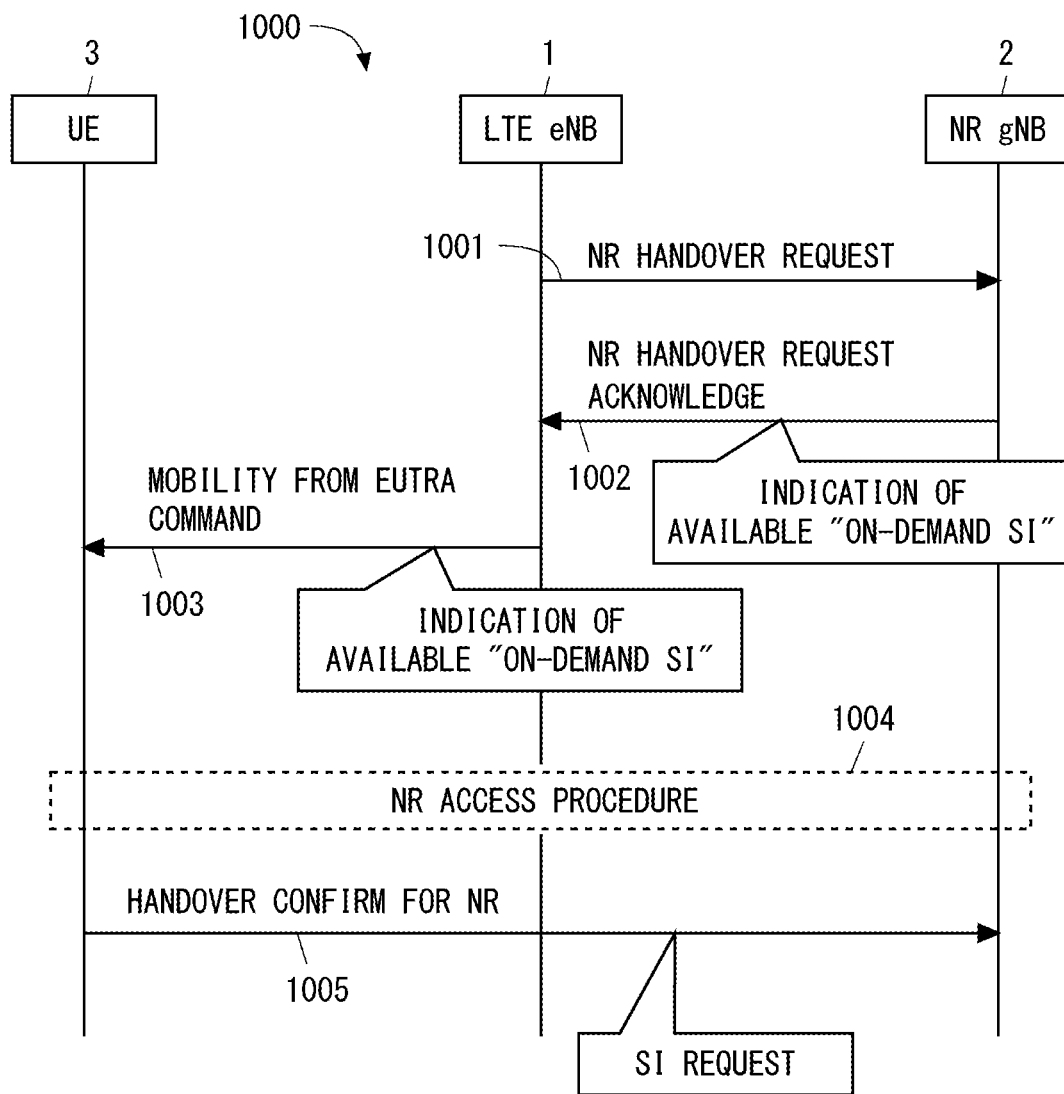
FIG. 10 is a sequence diagram showing an example of an Inter-RAT handover procedure according to a third embodiment.

FIG. 10 is a sequence diagram showing a process 1000 that is one example of an Inter-RAT handover procedure according to this embodiment. In Step 1001, the source LTE eNB 1 sends an NR Handover Request message to the target gNB 2 on the direct inter-base station interface 403 (e.g., an Xn interface or an X3 interface). The NR Handover Request message in Step 1001 may include a Handover Type Information Element (IE) indicating a handover from LTE to NR. For example, the Handover Type IE is set to "LTEtoNR".

In Step 1002, the target gNB 2 creates a UE context based on the NR Handover Request message and allocates resources. Then the target gNB 2 sends an NR Handover Request Acknowledge message to the source eNB 1. The NR Handover Request Acknowledge message is a response message to the NR Handover Request message. The NR Handover Request Acknowledge message includes a radio resource configuration of the target NR cell 21 created by the target gNB 2. The radio resource configuration is sent to the UE 3 via the source eNB 1. The NR Handover Request Acknowledge message in Step 1002 further includes an indication of on-demand system information available in the cell of the target gNB 2.

In Step 1003, the source eNB 1 sends to the UE 3 an RRC message that contains a Handover Command message including the radio resource configuration information created by the target gNB 2. This RRC message may be, for example, a Mobility from EUTRA command message or may be an RRC Connection Reconfiguration message. The source eNB 1 may include the radio resource configuration information created by the target gNB 2 into the "MobilityControlInfoNR"IE within the RRC Connection Reconfiguration message. Further, the source eNB 1 includes the "indication of available On-demand SI" received from the target gNB 2 into the RRC message to be sent to the UE 3. The "indication of available On-demand SI" may be included into the "MobilityControlInfoNR"IE within the RRC Connection Reconfiguration message.

In Step 1004, the UE 3 moves to the target RAN (i.e., NR) in response to receiving the RRC message that contains the Handover Command message and executes a handover in accordance with the radio resource configuration information provided by the Handover Command message. The UE 3 thus establishes a radio connection with the target gNB 2.

In Step 1005, the UE 3 sends a Handover Confirm for NR message to the target gNB 2 after it has successfully synchronized with the target NR cell 21. The message in Step 1005 may be an (NR) RRC Connection Reconfiguration Complete message.

The UE 3 (i.e., the NR AS layer) checks the "indication of available On-demand SI" and determines whether the Other SI desired (or intended) by the UE 3 is available in the cell of the target gNB 2. The UE 3 may include an SI request into the RRC message (e.g., (NR) RRC Connection Reconfiguration Complete message) of Step 1005. The SI request is a request for transmission of the on-demand system information from the target gNB 2.

The transmission of the SI request in Step 1005 in FIG. 10 is one example. The UE 3 (i.e., the NR AS layer) may transmit the SI request in the random access procedure in Step 1004. The UE 3 may transmit, for example, the SI request via the first message (Msg1) (i.e., random access preamble) in the random access procedure. In this case, the UE 3 may select, from a preamble pool, a random access preamble associated with the number or identifier of the On-demand SI (Other SI) that the UE 3 desires and then transmit the selected preamble. Alternatively, the UE 3 may transmit the SI request in the third message (Msg3) of the random access procedure.

Figure 11:
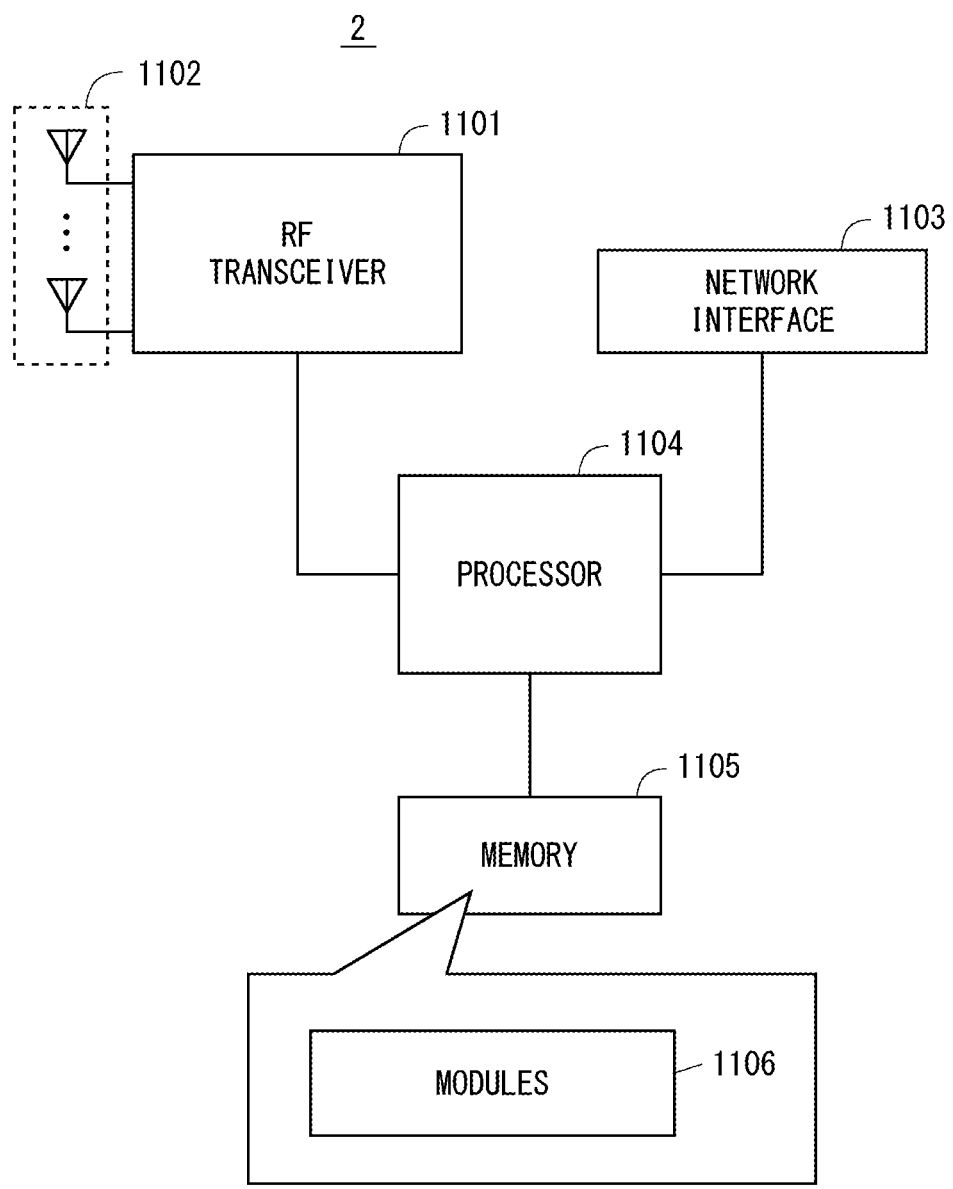
FIG. 11 is a block diagram showing a configuration example of an NR gNB according to a plurality of embodiments.

The following provides configuration examples of the LTE eNB 1, the NR gNB 2, and the UE 3 according to the above embodiments. FIG. 11 is a block diagram showing a configuration example of the NR gNB 2 according to the above embodiments. The configuration of the LTE eNB 1 may be similar to that shown in FIG. 11. Referring to FIG. 11, the NR gNB 2 includes a Radio Frequency transceiver 1101, a network interface 1103, a processor 1104, and a memory 1105. The RF transceiver 1101 performs analog RF signal processing to communicate with NG UEs including the UE 3. The RF transceiver 1101 may include a plurality of transceivers. The RF transceiver 1101 is coupled to an antenna array 1102 and the processor 1104. The RF transceiver 1101 receives modulated symbol data from the processor 1104, generates a transmission RF signal, and supplies the transmission RF signal to the antenna array 1102. Further, the RF transceiver 1101 generates a baseband reception signal based on a reception RF signal received by the antenna array 1102 and supplies the baseband reception signal to the processor 1104. The RF transceiver 1101 may include an analog beamformer circuit for beam forming. The analog beamformer circuit includes, for example, a plurality of phase shifters and a plurality of power amplifiers.

The network interface 1103 is used to communicate with network nodes (e.g., the LTE eNB 1, the MME 5, and the S-GW 6). The network interface 1103 may include, for example, a network interface card (NIC) conforming to the IEEE 802.3 series.

The processor 1104 performs digital baseband signal processing (i.e., data-plane processing) and control-plane processing for radio communication. The processor 1104 may include a plurality of processors. The processor 1104 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1104 may include a digital beamformer module for beam forming. The digital beamformer module may include a Multiple Input Multiple Output (MIMO) encoder and a pre-coder.

The memory 1105 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1105 may include a storage located apart from the processor 1104. In this case, the processor 1104 may access the memory 1105 via the network interface 1103 or an I/O interface (not shown).

The memory 1105 may store one or more software modules (computer programs) 1106 including instructions and data to perform processing by the gNB 2 described in the above embodiments. In some implementations, the processor 1104 may be configured to load the software modules 1106 from the memory 1105 and execute the loaded software modules, thereby performing processing of the gNB 2 described in the above embodiments.

Figure 12:
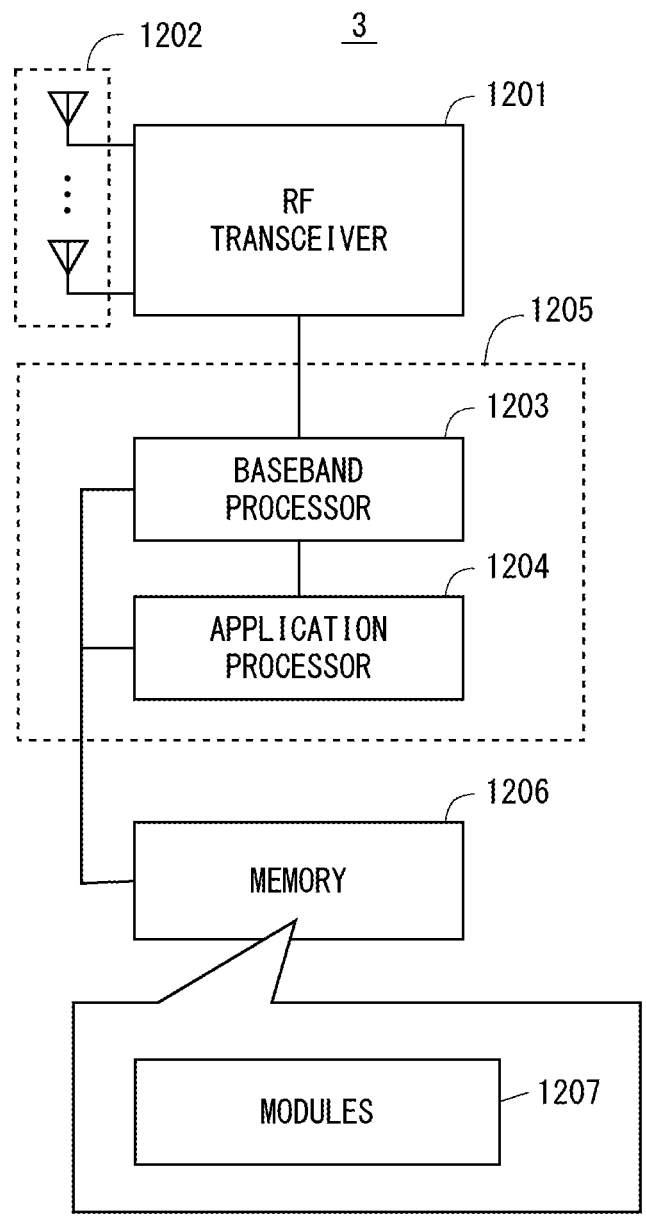
FIG. 12 is a block diagram showing a configuration example of a UE according to a plurality of embodiments.

FIG. 12 is a block diagram showing a configuration example of the UE 3. A Radio Frequency (RF) transceiver 1201 performs analog RF signal processing to communicate with the eNB 1 and the gNB 2. The RF transceiver 1201 may include a plurality of transceivers. The analog RF signal processing performed by the RF transceiver 1201 includes frequency up-conversion, frequency down-conversion, and amplification. The RF transceiver 1201 is coupled to an antenna array 1202 and a baseband processor 1203. The RF transceiver 1201 receives modulated symbol data (or OFDM symbol data) from the baseband processor 1203, generates a transmission RF signal, and supplies the transmission RF signal to the antenna array 1202. Further, the RF transceiver 1201 generates a baseband reception signal based on a reception RF signal received by the antenna array 1202 and supplies the baseband reception signal to the baseband processor 1203. The RF transceiver 1201 may include an analog beamformer circuit for beam forming. The analog beamformer circuit includes, for example, a plurality of phase shifters and a plurality of power amplifiers.

The baseband processor 1203 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1203 may include, for example, signal processing of a Packet Data Convergence Protocol (PDCP) layer, a Radio Link Control (RLC) layer, a MAC layer, and a PHY layer. Further, the control-plane processing performed by the baseband processor 1203 may include processing of a Non-Access Stratum (NAS) protocol, an RRC protocol, and MAC CEs.

The baseband processor 1203 may perform MIMO encoding and pre-coding for beam forming.

The baseband processor 1203 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1204 described in the following.

The application processor 1204 is also referred to as a CPU, an MPU, a microprocessor, or a processor core. The application processor 1204 may include a plurality of processors (processor cores). The application processor 1204 loads a system software program (Operating System (OS)) and various application programs (e.g., a call application, a WEB browser, a mailer, a camera operation application, and a music player application) from a memory 1206 or from another memory (not shown) and executes these programs, thereby providing various functions of the UE 3.

In some implementations, as represented by a dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. An SoC device may be referred to as a system Large Scale Integration (LSI) or a chipset.

The memory 1206 is a volatile memory, a non-volatile memory, or a combination thereof. The memory 1206 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1206 may include, for example, an external memory device that can be accessed from the baseband processor 1203, the application processor 1204, and the SoC 1205. The memory 1206 may include an internal memory device that is integrated in the baseband processor 1203, the application processor 1204, or the SoC 1205. Further, the memory 1206 may include a memory in a Universal Integrated Circuit Card (UICC).

The memory 1206 may store one or more software modules (computer programs) 1207 including instructions and data to perform the processing by the UE 3 described in the above embodiments. In some implementations, the baseband processor 1203 or the application processor 1204 may load these software modules 1207 from the memory 1206 and execute the loaded software modules, thereby performing the processing of the UE 3 described in the above embodiments with reference to the drawings.

As described above with reference to FIGS. 11 and 12, each of the processors included in the eNB 1, the gNB 2, and the UE 3 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The above-described embodiments describe examples in which the SgNB Addition procedure following the SeNB Addition procedure is used. In the above-described embodiments, an SgNB Modification procedure which follows the SeNB Modification procedure may instead be used in place of the SgNB Addition procedure. The MeNB 1 may send, for example, an SgNB Modification Request message to the SgNB 2 in place of the SgNB Addition Request message (e.g., Step 601 shown in FIG. 6).

The MeNB 1 may perform UE Capability Coordination between the MeNB 1 and the SgNB 2 before sending the radio bearer setup request (e.g., the SgNB Addition Request message or the SgNB Modification Request message) to the SgNB 2. The MeNB 1 may send, for example, a UE Capability Coordination Request message to the SgNB 2, and receive a UE Capability Coordination Response message from the SgNB 2. In this Coordination, the MeNB 1 and the SgNB 2 may share (or negotiate) only a fixed UE capabilities (e.g., capabilities that are not substantially changed while data is being transmitted or received in DC, or hard-split capabilities), such as RF capability (e.g., Band combination, measurement capability). The MeNB 1 and the SgNB 2 may also negotiate static UE capabilities (e.g., capabilities that are not dynamically changed during DC, or dynamically-shared capabilities), such as capabilities related to the UE category specification (e.g., soft buffer/soft channel bit). Alternatively, the MeNB 1 and the SgNB 2 may share static UE capabilities in the step of exchanging SeNB Addition Request/Acknowledge messages (or SeNB Modification Request/Acknowledge messages).

The Information Elements included in the messages described in the above-described embodiments (e.g., the SgNB Addition Request message, the SgNB Addition Request Acknowledge message, the RRC Connection Reconfiguration message, the RRC Connection Reconfiguration Complete message, the SgNB Reconfiguration Complete message, the NR Handover Request message, the NR Handover Request Acknowledge message) are not limited to the above-described ones. The Information Elements contained in the above-described messages may be, for example, communicated and negotiated in directions or between nodes different from those described in the above embodiments for the purpose of performing DC between the LTE eNB 1 and the NR gNB 2, or for the purpose of performing a handover from E-UTRA to NR. As a more specific example, at least some of the information elements included in the SgNB Addition Request message may be included in the SgNB Addition Request Acknowledge message. In addition or alternatively, at least a part of the information elements included in the SgNB Addition Request message may be included in a S1AP message sent from the EPC 4 (i.e., MME 5) to the LTE eNB 1 (e.g., S1AP: E-RAB Setup Request message). It is possible to allow nodes related to DC performed between the LTE eNB 1 and the NR gNB 2 to share information needed for the DC.

The operations and processes of the UE 3, the base station (the LTE eNB 1 and the NR gNB 2), and the core network (the EPC 4 and the 5G-CN 7) described in the aforementioned embodiments may also be applied to Intra-NR Dual Connectivity (DC) and Inter-gNB Handover. It is possible, for example, that availability of the on-demand system information may be different even between neighbour cells of one NR system. Accordingly, the secondary gNB or the target gNB may send to the UE 3, via the primary gNB or the source gNB, an indication of on-demand system information available in one or more its NR cells. This allows the UE 3 to know in advance what kind of on-demand system information is available (or supported) in the secondary cell or the target cell when initiating DC or handover. The UE 3 can thus acquire necessary information immediately after completing the configuration of the SCG for DC or immediately after completing the handover.

The LTE eNB 1 and the NR gNB 2 described in the above embodiments may be implemented based on a Cloud Radio Access Network (C-RAN) concept. The C-RAN is also referred to as a Centralized RAN. In this case, processes and operations performed by each of the LTE eNB 1 and the gNB 2 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP). That is, processes and operations performed by each of the LTE eNB 1 and the gNB 2 described in the above embodiments may be provided by one or more radio stations (or RAN nodes).

Further, the above-described embodiments are merely examples of applications of the technical ideas obtained by the inventors. These technical ideas are not limited to the above-described embodiments and various modifications may be made thereto.

For example, the whole or part of the above embodiments can be described as, but not limited to, the following supplementary notes.

(Supplementary Note 1)

A second radio access network (RAN) node used in a radio communication system, the second RAN node comprising:

a memory; and at least one processor coupled to the memory and configured to send to a radio terminal, via a first RAN node, an indication of available on-demand system information that is available in a cell of the second RAN node, wherein the available on-demand system information is to be transmitted in the cell of the second RAN node, or transmitted via the first RAN node, in response to a request from the radio terminal.

(Supplementary Note 2)

The second RAN node according to Supplementary Note 1, wherein the second RAN node is associated with a second Radio Access Technology (RAT), the at least one processor is configured to send to the radio terminal, via the first RAN node associated with a first RAT, a first Radio Resource Control (RRC) message including a configuration of a radio bearer of the second RAT for dual connectivity that uses the first RAT as a primary RAT and uses the second RAT as a secondary RAT, and the indication is included in the first RRC message.

(Supplementary Note 3)

The second RAN node according to Supplementary Note 1, wherein the second RAN node is associated with a second Radio Access Technology (RAT), the at least one processor is configured to send to the radio terminal, via the first RAN node associated with a first RAT, a second RRC message including a radio resource configuration of the second RAT for an inter-RAT handover of the radio terminal from the first RAT to the second RAT, and the indication is included in the second RRC message.

(Supplementary Note 4)

The second RAN node according to any one of Supplementary Notes 1 to 3, wherein the indication includes an indication list or an indication bitmap indicating numbers or identifiers of the available on-demand system information.

(Supplementary Note 5)

A first radio access network (RAN) node used in a radio communication system, the first RAN node comprising:

a memory; and at least one processor coupled to the memory and configured to:

receive from a second RAN node an indication of available on-demand system information that is available in a cell of the second RAN node; and transmit the indication to a radio terminal in a cell of the first RAN node, wherein the available on-demand system information is to be transmitted in the cell of the second RAN node, or transmitted via the first RAN node, in response to a request from the radio terminal.

(Supplementary Note 6)

The first RAN node according to Supplementary Note 5, wherein the first RAN node is associated with a first Radio Access Technology (RAT), the at least one processor is configured to: receive, from the second RAN node associated with a second RAT, a first Radio Resource Control (RRC) message including a configuration of a radio bearer of the second RAT for dual connectivity that uses the first RAT as a primary RAT and uses the second RAT as a secondary RAT; and forward the first RRC message to the radio terminal in the cell of the first RAN node, and the indication is included in the first RRC message.

(Supplementary Note 7)

The first RAN node according to Supplementary Note 6, wherein the at least one processor is configured to:

receive a second RRC message, which is transmitted by the radio terminal in response to the first RRC message, during a procedure for configuring the radio bearer for the dual connectivity; and retrieve from the second RRC message a request for transmission of the on-demand system information and forward the request to the second RAN node.

(Supplementary Note 8)

The first RAN node according to Supplementary Note 5, wherein the first RAN node is associated with a first Radio Access Technology (RAT), the at least one processor is configured to: receive, from the second RAN node associated with a second RAT, a third RRC message including a radio resource configuration of the second RAT for an inter-RAT handover of the radio terminal from the first RAT to the second RAT; and forward the third RRC message to the radio terminal in the cell of the first RAN node, and the indication is included in the third RRC message.

(Supplementary Note 9)

The first RAN node according to any one of Supplementary Notes 5 to 8, wherein the indication includes an indication list or an indication bitmap indicating numbers or identifiers of the available on-demand system information.

(Supplementary Note 10)

A radio terminal used in a radio communication system, the radio terminal comprising:

at least one wireless transceiver configured to communicate with a first radio access network (RAN) node and a second RAN node; and at least one processor configured to receive from the second RAN node, via the first RAN node, an indication of available on-demand system information that is available in a cell of the second RAN node, wherein the available on-demand system information is to be transmitted in the cell of the second RAN node, or transmitted via the first RAN node, in response to a request from the radio terminal.

(Supplementary Note 11)

The radio terminal according to Supplementary Note 10, wherein the at least one processor is configured to receive from the second RAN node associated with a second Radio Access Technology, via the first RAN node associated with a first RAT, a first Radio Resource Control (RRC) message including a configuration of a radio bearer of the second RAT for dual connectivity that uses the first RAT as a primary RAT and uses the second RAT as a secondary RAT, and the indication is included in the first RRC message.

(Supplementary Note 12)

The radio terminal according to Supplementary Note 11, wherein the at least one processor is configured to transmit a second RRC message in response to the first RRC message, wherein the second RRC message includes a request for transmission of the on-demand system information by the second RAN node.

(Supplementary Note 13)

The radio terminal according to Supplementary Note 11 or 12, wherein the at least one processor is configured to, after receiving the first RRC message, transmit a request for transmission of the on-demand system information during a random access procedure for synchronizing with the cell of the second RAN node.

(Supplementary Note 14)

The radio terminal according to Supplementary Note 11 or 12, wherein the at least one processor is configured to, after configuring the radio bearer of the second RAT for the dual connectivity, transmit a request for transmission of the on-demand system information, in the cell of the second RAN node via RRC signaling or via a Medium Access Control (MAC) Control Element (CE).

(Supplementary Note 15)

The radio terminal according to Supplementary Note 10, wherein the at least one processor is configured to receive from the second RAN node associated with a second Radio Access Technology, via the first RAN node associated with a first RAT, a third Radio Resource Control (RRC) message including a radio resource configuration of the second RAT for an inter-RAT handover of the radio terminal from the first RAT to the second RAT, and the indication is included in the third RRC message.

(Supplementary Note 16)

The radio terminal according to any one of Supplementary Notes 10 to 15, wherein the indication includes an indication list or an indication bitmap indicating numbers or identifiers of the available on-demand system information.

(Supplementary Note 17)

A method for a second radio access network (RAN) node used in a radio communication system, the method comprising:

sending to a radio terminal, via a first RAN node, an indication of available on-demand system information that is available in a cell of the second RAN node, wherein the available on-demand system information is to be transmitted in the cell of the second RAN node, or transmitted via the first RAN node, in response to a request from the radio terminal.

(Supplementary Note 18)

A method for a first radio access network (RAN) node used in a radio communication system, the method comprising:

receiving from a second RAN node an indication of available on-demand system information that is available in a cell of the second RAN node; and transmitting the indication to a radio terminal in a cell of the first RAN node, wherein the available on-demand system information is to be transmitted in the cell of the second RAN node, or transmitted via the first RAN node, in response to a request from the radio terminal.

(Supplementary Note 19)
A method for a radio terminal used in a radio communication system, the method comprising:
receiving from a second radio access network (RAN) node, via a first RAN node, an indication of available on-demand system information that is available in a cell of the second RAN node,
wherein the available on-demand system information is to be transmitted in the cell of the second RAN node, or transmitted via the first RAN node, in response to a request from the radio terminal.

(Supplementary Note 20)
A program for causing a computer to perform a method for a second radio access network (RAN) node used in a radio communication system,
wherein the method comprises sending to a radio terminal, via a first RAN node, an indication of available on-demand system information that is available in a cell of the second RAN node,
wherein the available on-demand system information is to be transmitted in the cell of the second RAN node, or transmitted via the first RAN node, in response to a request from the radio terminal.

(Supplementary Note 21)
A program for causing a computer to perform a method for a first radio access network (RAN) node used in a radio communication system, wherein the method comprises:
receiving from a second RAN node an indication of available on-demand system information that is available in a cell of the second RAN node; and
transmitting the indication to a radio terminal in a cell of the first RAN node,
wherein the available on-demand system information is to be transmitted in the cell of the second RAN node, or transmitted via the first RAN node, in response to a request from the radio terminal.

(Supplementary Note 22)
A program for causing a computer to perform a method for a radio terminal used in a radio communication system,
wherein the method comprises receiving from a second radio access network (RAN) node, via a first RAN node, an indication of available on-demand system information that is available in a cell of the second RAN node,
wherein the available on-demand system information is to be transmitted in the cell of the second RAN node, or transmitted via the first RAN node, in response to a request from the radio terminal.

This application is based upon and claims the benefit of priority from Japanese Patent Application No. 2017-000799, filed on Jan. 5, 2017, the disclosure of which is incorporated herein in its entirety by reference.

REFERENCE SIGNS LIST 1 eNodeB (eNB)
2 gNodeB (gNB)
3 User Equipment (UE)
4 Evolved Packet Core (EPC)
5 Mobility Management Entity (MME)
1101 RF Transceiver
1104 Processor
1105 Memory
1201 RF Transceiver
1203 Baseband Processor
1204 Application Processor
1206 Memory

The invention claimed is:

1. A method of a source base station, the method comprising: transmitting a handover request message to a target base station; receiving a handover request acknowledge message from the target base station, the handover request acknowledge message including a Radio Resource Control (RRC) message; and transmitting the RRC message to a UE, wherein the RRC message includes: an indication of a System Information Block (SIB) type of at least one on-demand system information that is available by the target base station but is not being broadcasted, and scheduling information of at least one on-demand system information that is available by the target base station and is being broadcasted by the target base station, wherein the RRC message further includes scheduling information of the at least one on-demand system information that is available by the target base station but is not being broadcasted.

2. The method according to claim 1, wherein the RRC message is related to a reconfiguration of a RRC.

3. A method of a UE, the method comprising: receiving a first message from a source base station during a handover procedure for performing a handover from the source base station to a target base station; and transmitting a second message to the target base station, wherein the first message is a Radio Resource Control (RRC) message that includes: an indication of a System Information Block (SIB) type of at least one on-demand system information that is available by the target base station but is not being broadcasted, and scheduling information of at least one on-demand system information that is available by the target base station and is being broadcasted by the target base station, and wherein the first message is included in a handover request acknowledge message which is transmitted from the target base station, wherein the RRC message further includes scheduling information of the at least one on-demand system information that is available by the target base station but is not being broadcasted.

4. The method according to claim 3, wherein the first message is related to a reconfiguration of a RRC and the second message is related to a complete of the RRC reconfiguration.

5. The method according to claim 3, wherein the second message acts as a request of on-demand system information.

6. The method according to claim 3, wherein the second message is sent in a Random Access procedure.

7. The method according to claim 1, wherein the at least one on-demand system information that is available by the target base station but is not being broadcasted is not being broadcasted by the target base station at a time when the RRC message is transmitted to the UE.

8. The method according to claim 3, wherein the at least one on-demand system information that is available by the target base station but is not being broadcasted is not being broadcasted by the target base station at a time when the RRC message is transmitted to the UE.

9. A method of a target base station, the method comprising: receiving, from a source base station, a handover request message; and transmitting, to the source base station, a handover request acknowledge message including a Radio Resource Control (RRC) message, wherein the RRC message includes: an indication of a System Information Block (SIB) type of at least one on-demand system information that is available by the target base station but is not being broadcasted, and scheduling information of at least one on-demand system information that is available by the target base station and is being broadcasted by the target base station, wherein the RRC message further includes scheduling information of the at least one on-demand system information that is available by the target base station but is not being broadcasted.

10. A non-transitory computer readable medium storing a program causing a computer to execute process, the process comprising: receiving, from a source base station, a handover request message; and transmitting, to the source base station, a handover request acknowledge message including a Radio Resource Control (RRC) message, wherein the RRC message includes: an indication of a System Information Block (SIB) type of at least one on-demand system information that is available by the target base station but is not being broadcasted, and scheduling information of at least one on-demand system information that is available by the target base station and is being broadcasted by the target base station, wherein the RRC message further includes scheduling information of the at least one on-demand system information that is available by the target base station but is not being broadcasted.

* * * * *